July 6, 1948.  S. G. JOHNSON  2,444,702

MULTIPLE DIAMETER GAUGE

Filed May 17, 1945

INVENTOR
Stanley G. Johnson
BY Bohleber, Fassett & Montstream
ATTORNEYS

Patented July 6, 1948

2,444,702

UNITED STATES PATENT OFFICE 2,444,702

MULTIPLE DIAMETER GAUGE

Stanley G. Johnson, West Hartford, Conn.

Application May 17, 1945, Serial No. 594,221

6 Claims. (Cl. 33—199)

The invention relates to a gage for determining whether or not a plurality of diameters on a test part are within allowable tolerances. Such multiple gages heretofore used for testing a plurality of diameters have provision for adjusting each of the gaging elements for each different diameter to be gaged, which involves considerable accurate machining. The gage to be described herein permits adjustment for each diameter to be gaged and materially reduces the accurate machine work required. The gage may be constructed to gage a plurality of threaded elements or plain elements of different diameters, or a threaded element and a plain element upon the test part.

It is an object of the invention to construct a new and novel multiple gage.

Another object is to construct a multiple gage for testing a plurality of diameters on a test part in which the adjustment means requires a minimum of accurate machine work.

Another object of the invention is to construct a multiple gage for gaging a plurality of diameters on a test part in which each pair of cooperating gaging elements or means are mounted upon different studs or mounting means and includes a non-adjustable or concentric mounting which cooperates with a gaging element having an eccentric or adjustable mounting, and the adjacent gaging elements or means which are mounted upon one stud include a concentrically mounted gaging element and an eccentrically mounted gaging element.

A still further object is to construct a multiple ring gage in which each gaging diameter thereof is separately adjustable.

Other objects of the invention will be more apparent from the following description taken in connection with the accompanying drawings, in which.

Figure 1:
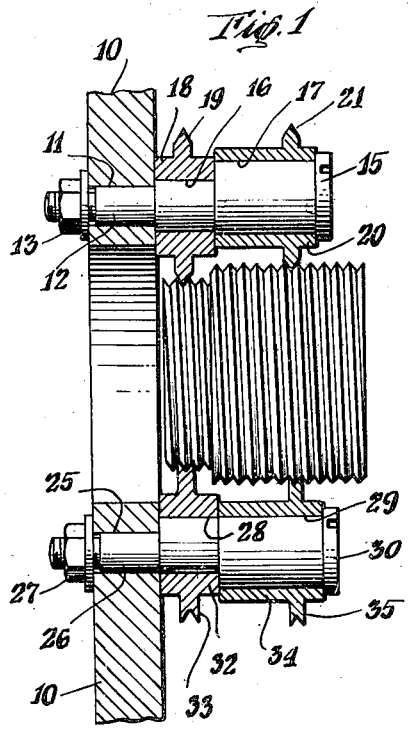
Figure 1 is a section through the gaging elements or means with a threaded test part having a plurality of diameters being gaged thereby.
Figure 2:
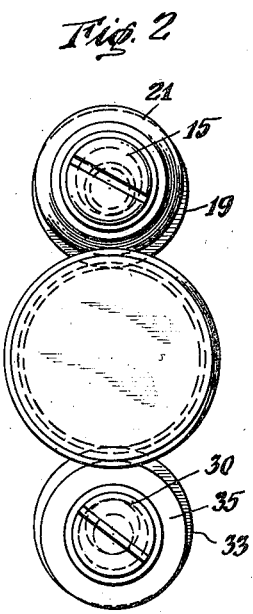
Figure 2 is an end view of the gage.
Figure 3:
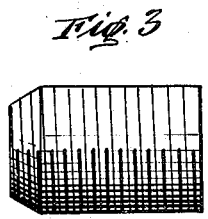
Figure 3 illustrates another type of thread on a test part in which a plurality of diameters thereon may be simultaneously gaged.
Figure 4:
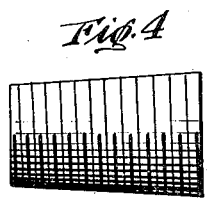
Figure 4 shows a taper thread having a plurality of diameters which may be simultaneously gaged by the gage described herein.

The gage includes a frame 10 which may be of U-shaped form and has a frame bearing such as a hole 11 in one arm thereof which receives a stud or mounting means 12 upon which gaging means are carried. The mounting means is rotated for adjustment and retained in adjusted position by any suitable means, that illustrated including a threaded end upon the stud which receives a nut 13. The stud or mounting means preferably carries roller gaging means and hence has a bearing 16 which is concentric with the frame bearing 11 and one adjacent bearing 17 which is eccentric with respect to the axis of the frame bearing 11 as well as the axis of the roller bearing 16. The stud may carry a flange 15 upon the end thereof for retaining the gaging means or roller upon the stud.

A gaging roller 18 is received upon the concentric bearing 16 which for a thread gage would carry a gaging element such as the rib 19. The eccentric bearing 17 also carries a gaging roller 20 which for a thread gage would carry a thread gaging element such as a rib 21.

The frame 10 carries cooperating gaging means which are spaced from the other gaging means so that the frame is provided with a bearing such as a hole 25 in the other arm of the U shaped frame. A stud or mounting means 26 is received in the bearing and may be rotated therein for adjustment. It is retained in adjusted position by any suitable means such as by threads upon the end of the stud which receives a nut 27. The stud carries gaging means which preferably are of the roller type and hence includes a bearing 28 which is eccentric with respect to the axis of bearing 25 and at least one adjacent bearing 29 which is concentric with respect to the axis of the frame bearing 25. The stud may carry a shoulder or flange 30 upon the end thereof to retain the end roller gaging means thereupon.

The eccentric bearing 28 carries a gaging roller 32 which for a screw thread gage may include a V 33 for cooperation with the screw thread rib 19 on the cooperating gaging roller 18. The concentric bearing 29 also carries a gaging roller 34 which for a screw thread gage would carry a V 35 for cooperation with the screw thread gaging rib 21. It is immaterial which stud carries the cone roller and the V roller.

It will be observed that of the pair of cooperating gaging rollers 18 and 32, one of the gaging rollers is mounted upon a concentric bearing 16, which therefore is non-adjustable and the other gaging roller 32 is mounted upon an eccentric bearing 28 and is therefore adjustable. Similarly, of the cooperating gaging rollers 20 and 34, one roller 34 is mounted upon a concentric or non-adjustable bearing 29 and its cooperating gaging roller 20 is mounted upon an eccentric or adjusting bearing 17. Of the cooperating pairs of rollers, one is adjustable and the other is non-adjustable. It will further be observed that each stud contains a concentric or non-adjusting bearing and its adjacent bearing is eccentric or adjusting. Adjustment of the position of the stud 12 will adjust the gaging roller 18 only and the gaging roller 20 will remain unadjusted with respect to the frame bearing 11. Likewise the stud 26 has an eccentric bearing 28 and a concentric bearing 29 so that adjustment of the position of this stud will adjust the gaging roller 32 but will not adjust the gaging roller 34. With this construction, the gaging position of either pair of cooperating gaging means or rollers may be adjusted without affecting the relative position of the other.

Although this type of adjustment may change the relative axis of the gaging elements to an angular one, the extent of angular displacement of the gage axis is dependent upon the extent of adjustment or eccentricity which when held within practical limits the deviation from a parallel axis is not sufficient to cause any ineffectiveness in the gaging of a test part.

Figure 5:
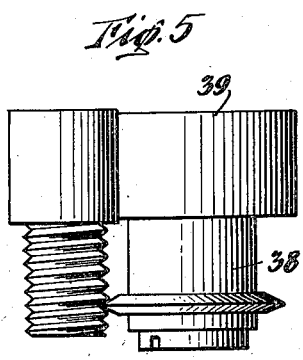
Figure 5 shows a gage roller for plain surfaces and a threaded gage roller adapted to be mounted upon a stud of the gage for testing the threaded portion and the cylindrical portion of a stud.
Figure 7:
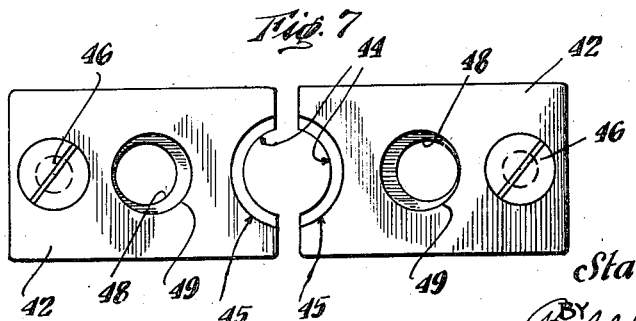
Figure 7 is an end view of the gaging means of Figure 6.

The gaging means illustrated in Figure 5 includes a thread gaging roller 38 and a cylindrical gaging roller 39 which are adapted to be carried by one mounting means or stud in order to gage the thread and the head of the screw illustrated. A like pair of gaging means is carried by the other stud. One of each pair of cooperating gaging means is adjustable but likewise of a pair of adjacent gaging means on the same stud one is adjustable and the other is non-adjustable.

Figure 6:
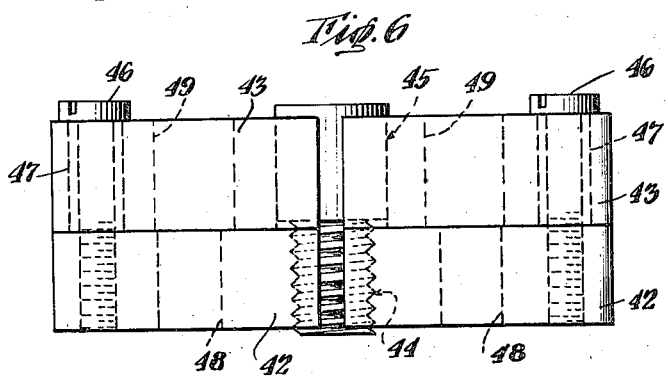
Figure 6 shows a pair of gaging means having concave gaging portions adapted to be mounted upon a stud or mounting means.

Figure 6 illustrates a pair of adjacent gaging means 42 and 43, one such pair being mounted upon or carried by each of the studs or mounting means 12 and 26. The stud is received in the holes or bearings 48 and 49 in the respective gaging means 42 and 43. Each gaging means has a concave gaging portion, the gaging portion 44 being threaded to receive the thread of a test part and the gaging portion 45 being smooth to receive the head of a test screw. When the stud or studs have been adjusted to the desired relative position of the gaging means which may be determined such as by a master plug, the gaging means are retained against rotation by any desired means. The means illustrated includes a locking screw 46 which when tightened holds or clamps the adjacent gaging means in adjusted position with respect to each other and because of the eccentricity of one gaging means bearing with respect to the other, the two gaging parts are also retained in cooperative position upon its stud. The gaging means 43 has a hole 47 larger than the locking screw so that one gaging means may be adjusted relatively to the other. The gage serves as a ring gage to test a plurality of diameters upon a test part and their relative concentricity.

It will be noted that the gage described herein requires only one of the gaging roller bearings to be machined eccentric with respect to the mounting bearing in the frame, and consequently the cost of the machine operation is materially reduced since it is the machining of the eccentric bearing which requires considerable care in the manufacturing process. Such a gage therefore may be manufactured at a substantial saving in cost. It is clear also that the gaging means may be the stud itself without rollers although the preferred construction provides them which decreases the wear upon the gaging means.

This invention provides an improvement in a multiple gage. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage for gaging a plurality of diameters on a test part comprising a frame having a pair of spaced frame bearings, a pair of cylindrical gaging means carried by each frame bearing and adjustable rotatably with respect thereto, one gaging means being concentric with respect to the frame bearing and one gaging means being eccentric thereto, each concentric gaging means being opposite to and cooperating with an eccentric gaging means carried by the other frame bearing, and means to retain each gaging means in adjusted position.

2. A gage for gaging a plurality of diameters on a test part comprising a frame having a plurality of spaced frame bearings, mounting means carried by each frame bearing and rotatably adjustable with respect thereto, each mounting means having a pair of bearings to receive gaging means, each mounting means having one gaging means bearing concentric with the frame bearing and one gaging means bearing eccentric thereto, each concentric gaging means bearing upon one mounting means being opposite to an eccentric gaging means bearing on another mounting means, means to secure each mounting means in adjusted position, and a gaging means upon each gaging means bearing.

3. A roll snap gage for gaging a plurality of diameters on a test part comprising a frame having a plurality of spaced frame bearings, mounting means carried by each frame bearing and rotatably adjustable with respect thereto, each mounting means having a pair of gaging roller bearings, each mounting means having one gaging roller bearing concentric with the frame bearing and one gaging roller bearing eccentric thereto, each concentric gaging roller bearing upon one mounting means being opposite to an eccentric gaging roller bearing on another mounting means, means to secure each mounting means in adjusted position, and a gaging roller upon each gaging roller bearing.

4. A roll snap gage for gaging a plurality of diameters on a test part comprising a frame having a pair of spaced frame bearings, mounting means carried by each frame bearing and adjustable rotatably with respect thereto, each mounting means having a pair of gaging roller bearings, each mounting means having one gaging roller bearing concentric with the frame bearing and one gaging roller bearing eccentric thereto, each concentric gaging roller bearing upon one mounting means being opposite to an eccentric gaging roller bearing on the other mounting means, means to secure each mounting means in adjusted position, and a gaging roller upon each gaging roller bearing.

5. A roll snap thread gage for gaging the threads of a plurality of diameters on a single test part comprising a frame having a pair of spaced frame bearings, mounting means carried by each frame bearing and adjustable rotatably with respect thereto, each mounting means having a plurality of gaging roller bearings, each mounting means having one gaging roller bearing concentric with the frame bearing and one gaging roller bearing eccentric thereto, the concentric bearing upon one mounting means being opposite to an eccentric bearing on the other mounting means, means to secure each mounting means in adjusted position, and a gaging roller upon each gaging roller bearing and having a thread engaging means thereupon.

6. A gage for gaging a plurality of diameters on a test part comprising a frame having a plurality of spaced frame bearings, mounting means carried by each frame bearing and rotatably adjustable with respect thereto, each mounting means having a pair of bearings for gaging means, each mounting means having one gaging means bearing concentric with the frame bearing and one gaging means bearing eccentric thereto, each concentric gaging means bearing upon one mounting means being opposite to an eccentric gaging means bearing on the other mounting means, means to secure each mounting means in adjusted position, a gaging means upon each gaging means bearing, a concave gaging portion upon each gaging means, the concave gaging portions of cooperative gaging means being directed towards each other, and means to secure together the adjacent gaging means.

STANLEY G. JOHNSON.

REFERENCES CITED

The following references are of record in the file of this patent:

UNITED STATES PATENTS

| Number | Name | Date |
|---|---|---|
| 1,138,438 | Bailey | May 4, 1915 |
| 1,660,335 | Johnson | Feb. 28, 1928 |
| 2,387,218 | Troedson | Oct. 16, 1945 |

FOREIGN PATENTS

| Number | Country | Date |
|---|---|---|
| 559,900 | Germany | 1932 |